(12) United States Patent
Hsu et al.

(10) Patent No.: US 11,365,756 B2
(45) Date of Patent: Jun. 21, 2022

(54) WOOD SCREW

(71) Applicants: Kuo-Tai Hsu, Tainan (TW); Ming-Hao Hsu, Tainan (TW)

(72) Inventors: Kuo-Tai Hsu, Tainan (TW); Ming-Hao Hsu, Tainan (TW)

(*) Notice: Subject to any disclaimer, the term of this patent is extended or adjusted under 35 U.S.C. 154(b) by 339 days.

(21) Appl. No.: 16/512,602

(22) Filed: Jul. 16, 2019

(65) Prior Publication Data

US 2021/0018030 A1    Jan. 21, 2021

(51) Int. Cl.
*F16B 25/00*    (2006.01)
*F16B 25/10*    (2006.01)

(52) U.S. Cl.
CPC ...... *F16B 25/0015* (2013.01); *F16B 25/0084* (2013.01); *F16B 25/103* (2013.01); *F16B 25/00* (2013.01)

(58) Field of Classification Search
CPC .. F16B 25/00; F16B 25/0015; F16B 25/0031; F16B 25/0057; F16B 25/0084; F16B 25/103; F16B 33/02; F16B 35/041; F16B 35/065
USPC ........... 411/387.1, 387.3, 411, 418, 420, 424
See application file for complete search history.

(56) References Cited

U.S. PATENT DOCUMENTS

| | | | | |
|---|---|---|---|---|
| 5,516,248 A | * | 5/1996 | DeHaitre | F16B 23/0015 411/387.2 |
| 6,109,850 A | * | 8/2000 | Commins | F16B 25/0031 411/387.2 |
| 2001/0009638 A1 | * | 7/2001 | Crawford | E04C 3/16 411/387.2 |
| 2004/0228705 A1 | * | 11/2004 | Baer | F16B 35/041 411/424 |
| 2007/0269287 A1 | * | 11/2007 | Runge | F16B 25/0015 411/378 |
| 2009/0185880 A1 | * | 7/2009 | Gong | F16B 25/0084 411/387.4 |
| 2011/0293387 A1 | * | 12/2011 | Chang | F16B 25/103 411/387.1 |
| 2013/0011214 A1 | * | 1/2013 | Lin | F16B 25/0057 411/387.4 |
| 2015/0184685 A1 | * | 7/2015 | Su | F16B 25/103 411/387.2 |
| 2016/0061247 A1 | * | 3/2016 | Gong | F16B 25/0021 411/387.2 |
| 2016/0186794 A1 | * | 6/2016 | Belinda | F16B 25/0015 411/387.1 |
| 2017/0284447 A1 | * | 10/2017 | Falkenstein | F16B 25/0047 |

* cited by examiner

*Primary Examiner* — Roberta S Delisle (74) *Attorney, Agent, or Firm* — Rosenberg, Klein & Lee (57) ABSTRACT

A wood screw is disclosed herein. It comprises a screw head and a rod body integrally extended from the screw head and having a shank part and a screwing part, wherein the screwing part comprises a straight surface surrounded with a threaded section and a cutting section on which a cutting unit is formed, and wherein a root diameter of the shank part is larger than root diameters of the threaded section and the cutting section respectively, and larger than or equal to a maximum outer diameter of the cutting section defined by the cutting unit.

12 Claims, 9 Drawing Sheets

WOOD SCREW

BACKGROUND OF THE INVENTION

1. Field of the Invention

The present invention relates to a wood screw which possesses great load-bearing capacity for the timber construction.

2. Description of Related Art

Wood screws are widely used for screwing and bonding objects. In the current wooden construction method, the beam-column bonding method is most common. It is achieved by jointing the beam and the column to form a frame and further assembling the wall and the floor on the frame, so the bonding and joint construction method have fundamental impacts on the structural safety of the entire building. The beam-column bonding construction method associated with the wood screws can be roughly divided into the following two types.

1. Bonding by pure woods: using a large wood construction material as the horizontal column and beam to bear weight, and then using wood screws to directly lock the column and beam and join them together.

2. Bonding the column and beam with the aids of hardware components: additionally using hardware components to connect or embed wood beams and columns so as to support and convey load.

Figure 8:
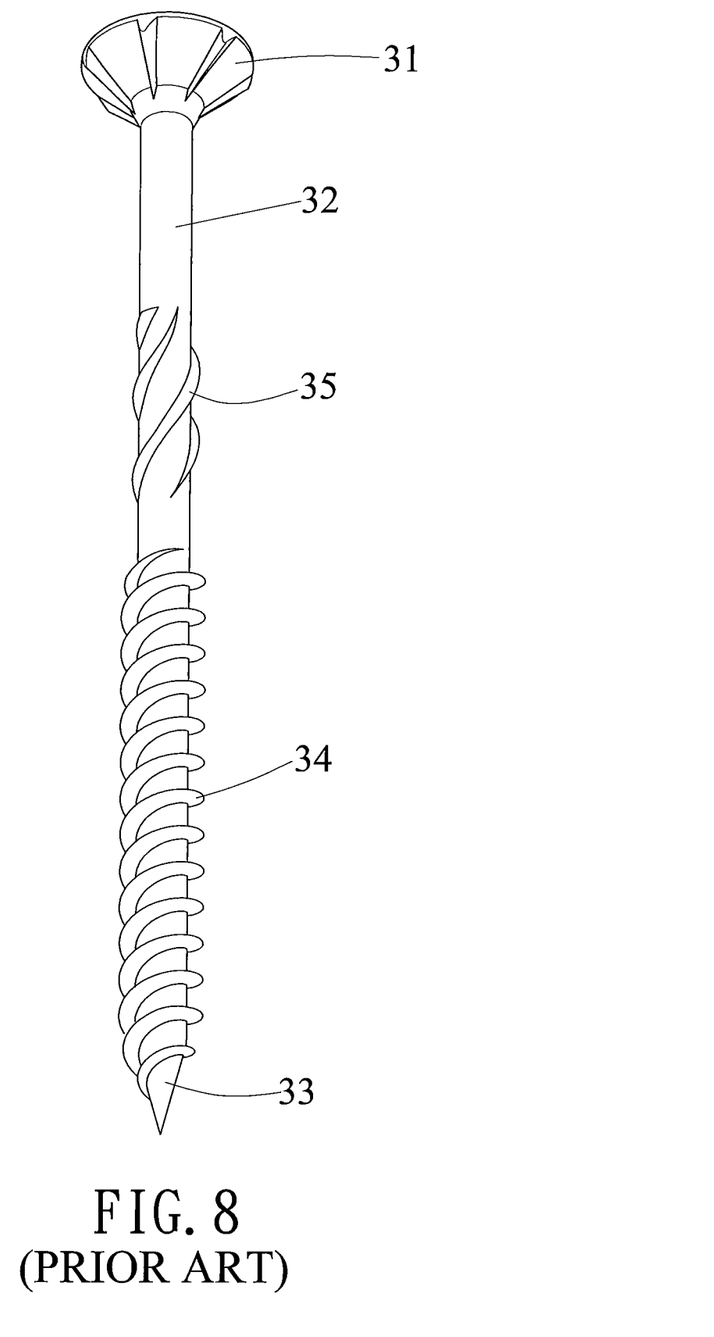
FIG. 8 is a schematic diagram showing a prior art.
Figure 9:
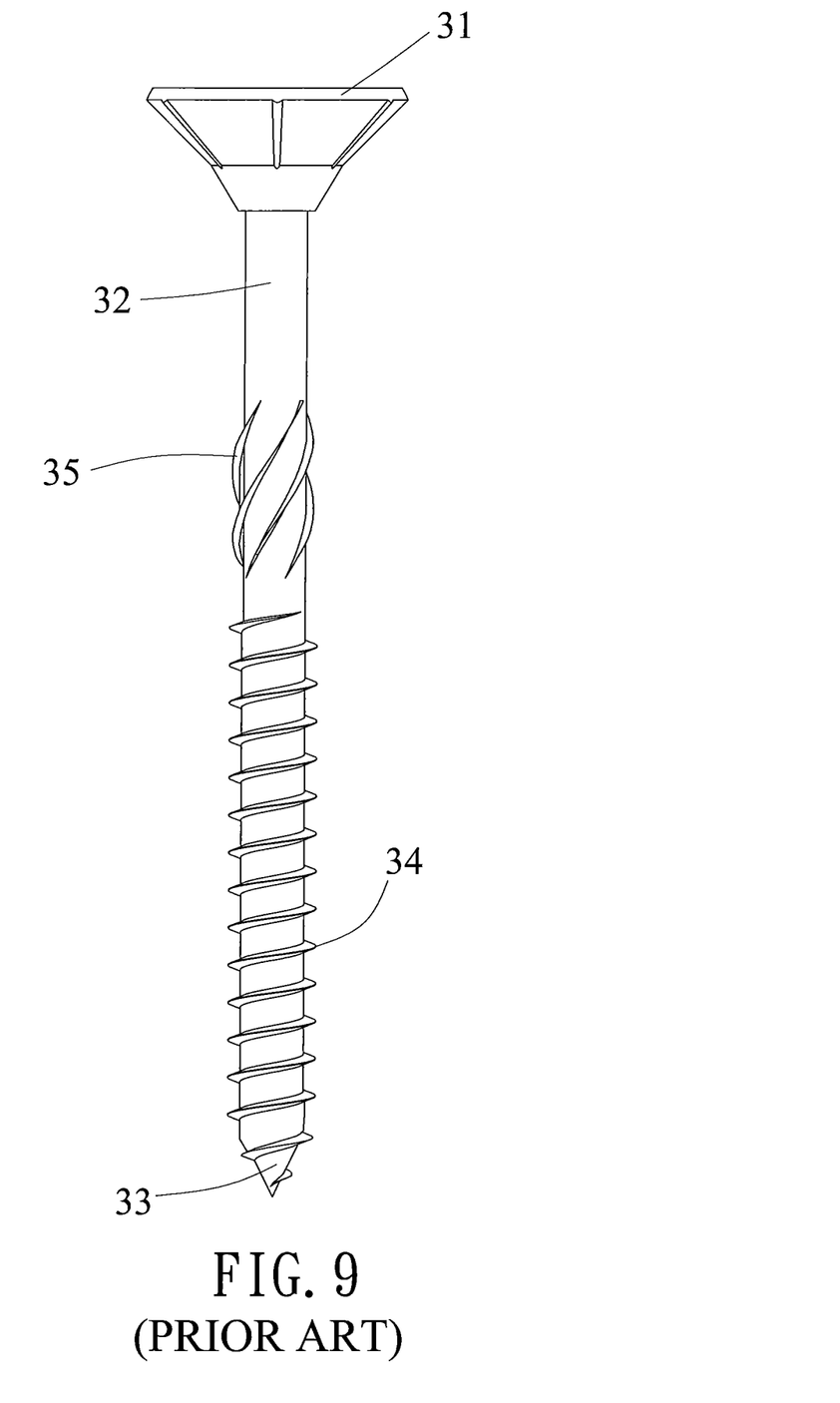
FIG. 9 is a lateral view showing a prior art.

Referring to FIG. 8 and FIG. 9, a conventional wood screw comprises a screw head (31) and a rod body (32) having one end integrally extended from a bottom of the screw head (31). The screw head (31) provides a locking tool to manipulate a screw action of the wood screw. The other end of the screw head (31) is provided with a tapered part (33), and the rod body (32) is provided with a thread (34) spirally wound from the tapered part (33) toward the screw head (31). Furthermore, a reamer thread (35) is provided above the thread (34). In use of the conventional wood screw, the tapered part (33) drills a wooden work piece, and then the thread (34) screws to the object so as to achieve efficiency of firmly screwing and locking the wooden work piece.

However, the wood screws used in the construction industry bear acting force from a horizontal or vertical structural surface and axial tensile force from a girder supporting the load-bearing wall. As the connected object exerts a tensile force on the wood screw, the threadless rod body in the junction is subjected to the shear stress. Accordingly, in actual use, the wood screw of the prior art still has disadvantages of:

1. The wood screw is not easy to penetrate a pre-drilled steel plate when used with hardware components due to the large diameter of the reamer thread.

2. The reamer thread directly formed on a smooth surface of the rod body has a diameter larger than a diameter of the rod body, so a large gap is formed between the structural girder and the rod body after the wood screw is screwed into the structural girder.

3. The reamer thread occupies part of the length of the rod body, resulting in a reduction in the portion of the rod body that can withstand shear stress, and thus the wood screw is prone to break at the position adjacent to the reamer thread.

SUMMARY OF THE INVENTION

In view of the above-mentioned problems, the object of the present invention is to provide a wood screw which comprises a threadless rod body having an increased diameter for tightly screwing into woods or hardware materials so as to effectively improve overall stability and bond strength.

The wood screw comprises a screw head and a rod body. The screw head is disposed at a top of the rod body. The rod body has a shank part and a screwing part. The screwing part comprises a threaded section and a cutting section on which a cutting unit is formed and connected between the threaded section and the shank part. The shank part has a root diameter larger than or equal to a maximum outer diameter of the cutting section defined by the cutting unit. Compared with the conventional technique available now, the cutting unit allocated ahead of the shank part of the present invention in the screw-in direction can break off the fiber structure of the wood material proactively so it can reduce a lateral resistance generated by the shank part of a larger diameter screwing into an object.

Furthermore, the cutting unit of the present invention enables to screw and cut the object to form a smooth inner cutting hole for correspondingly and tightly contacting the shank part of a larger diameter. Accordingly, the present invention can reduce a gap between the wood screw and the object by the shank part tightly contacting the inner cutting hole and achieve the effects of withstanding high tensile force and shear stress.

DETAILED DESCRIPTION OF THE PREFERRED EMBODIMENT

Hereinafter, an exemplary embodiment of the present invention will be described in detail with reference to the accompanying drawings.

Figure 1:
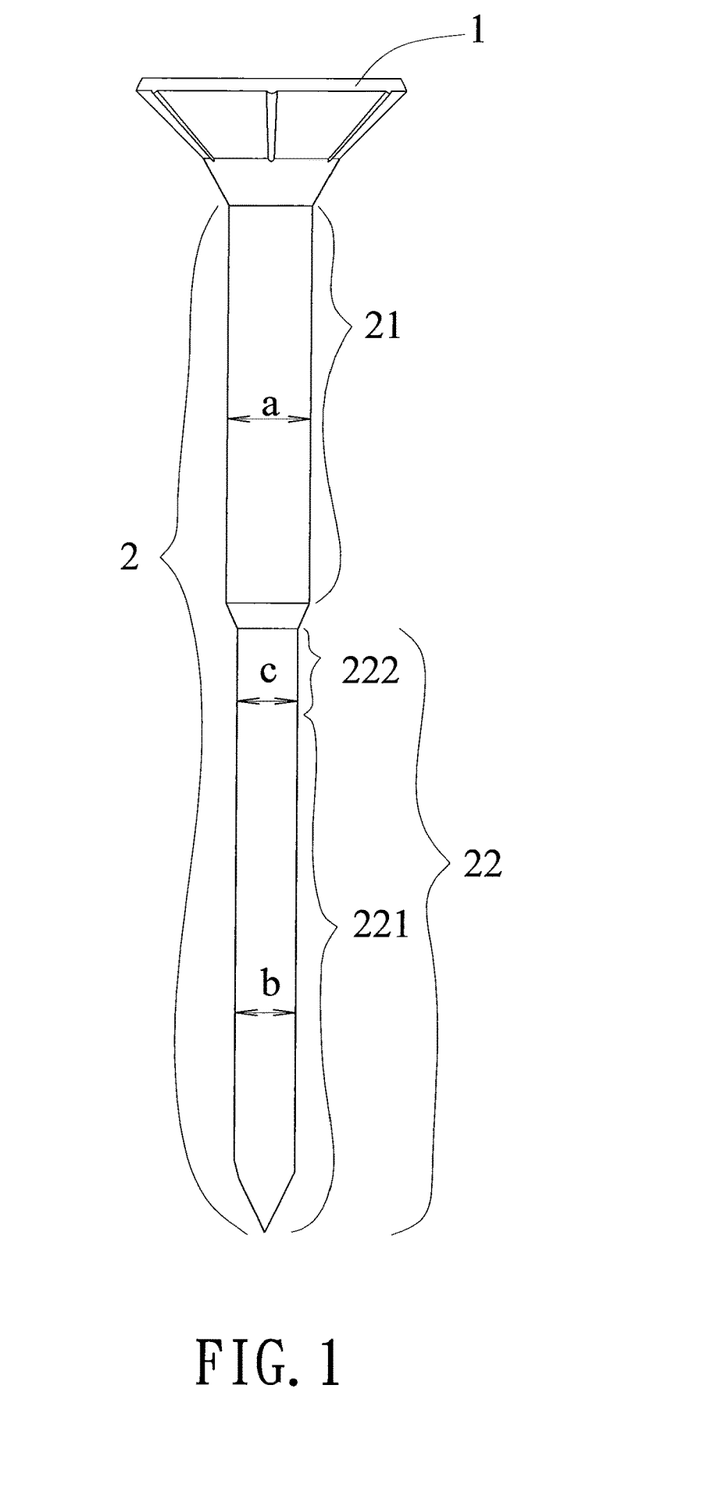
FIG. 1 is a schematic diagram showing a wood screw without a screw thread.
Figure 2:
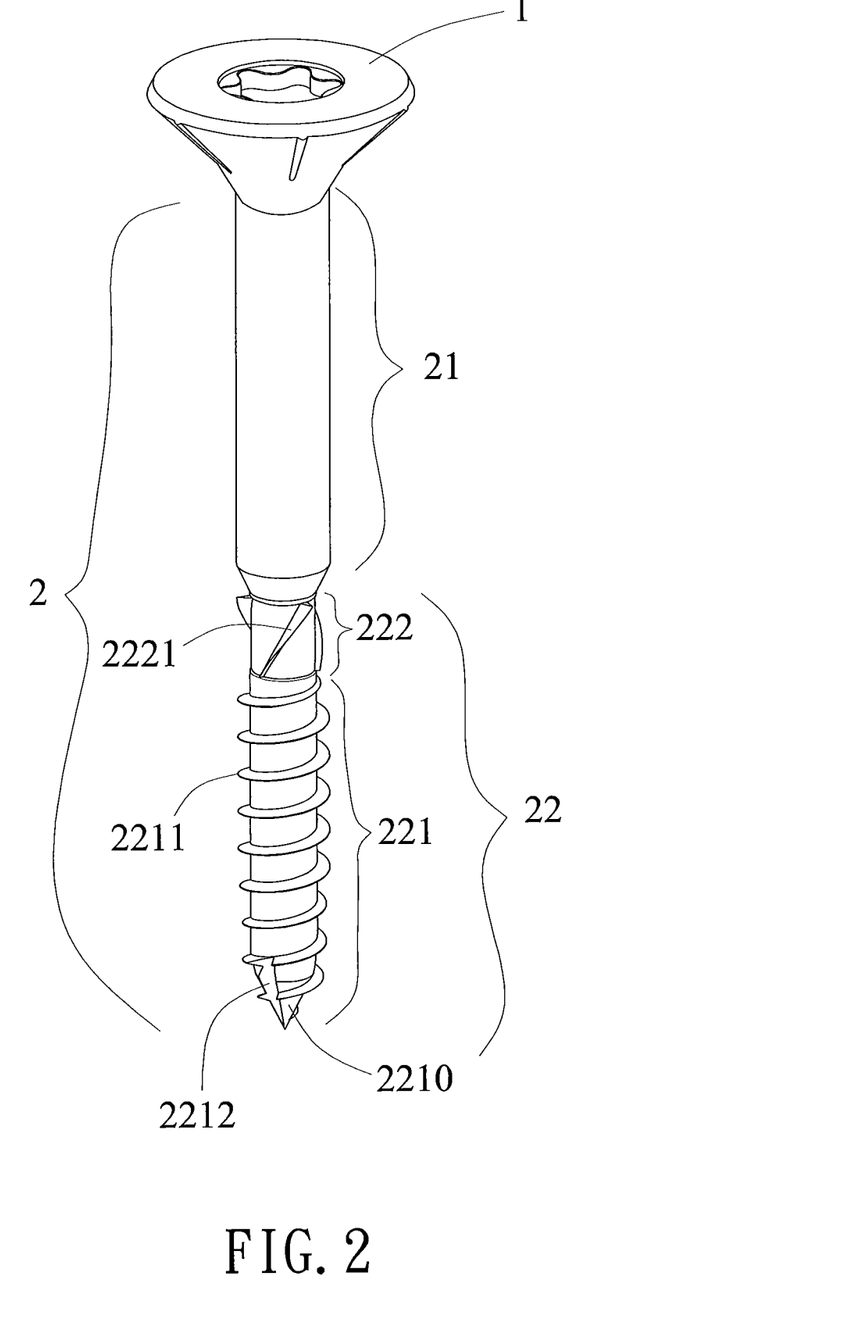
FIG. 2 is a stereogram showing a first embodiment for a wood screw according to the present invention.
Figure 3:
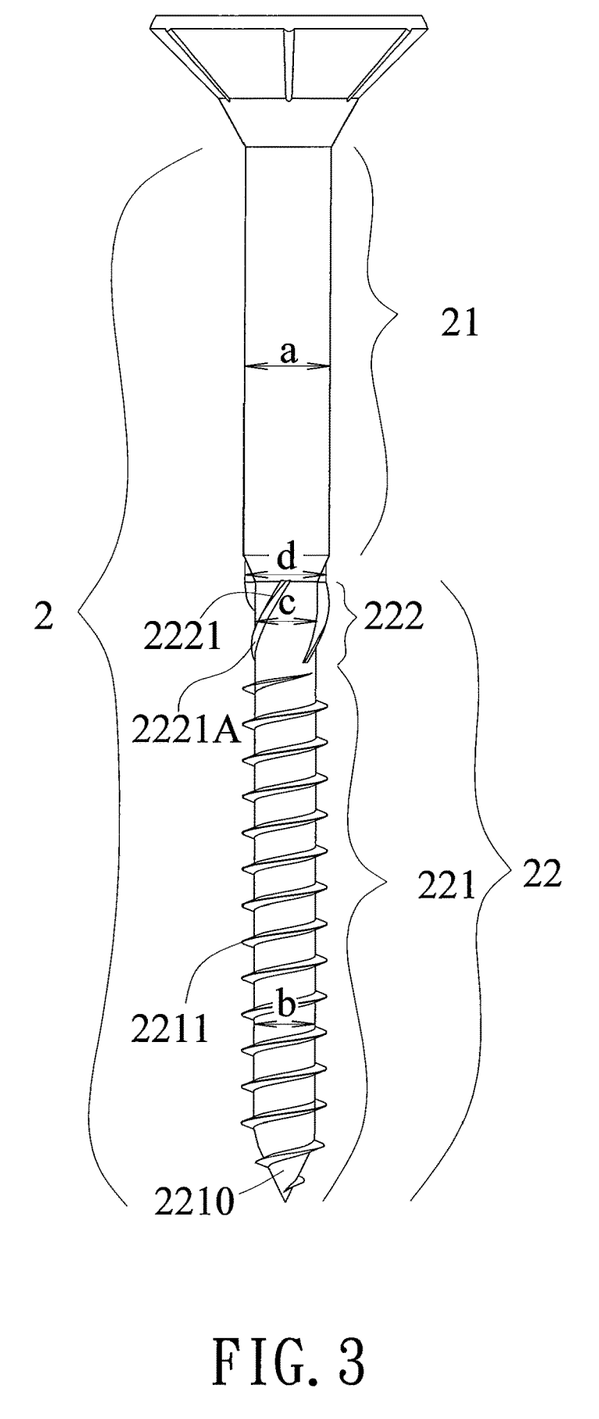
FIG. 3 is a lateral view showing the first embodiment for the wood screw according to the present invention.
Figure 4:
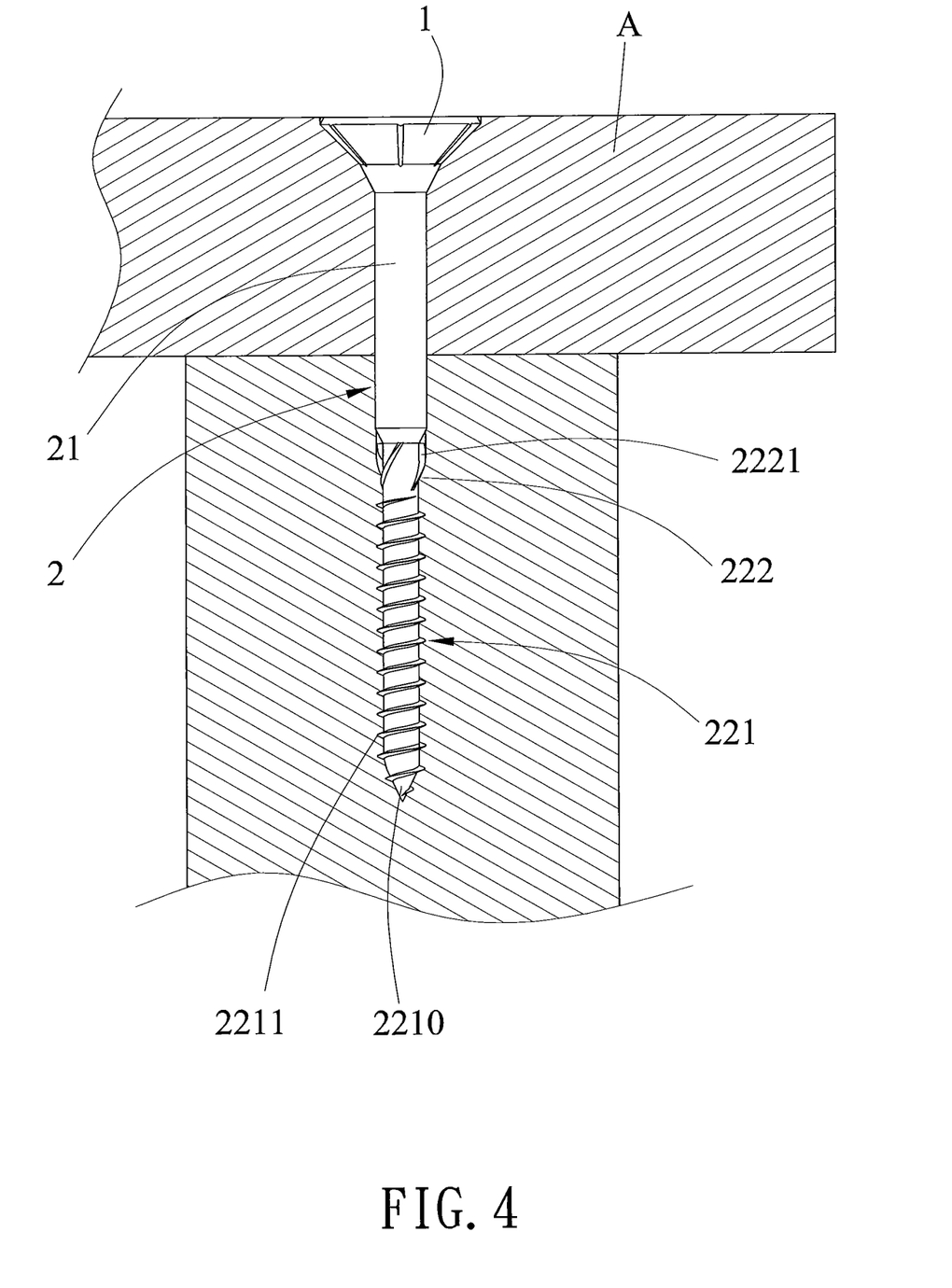
FIG. 4 is a schematic diagram showing the first embodiment for the wood screw in use.
Figure 5:
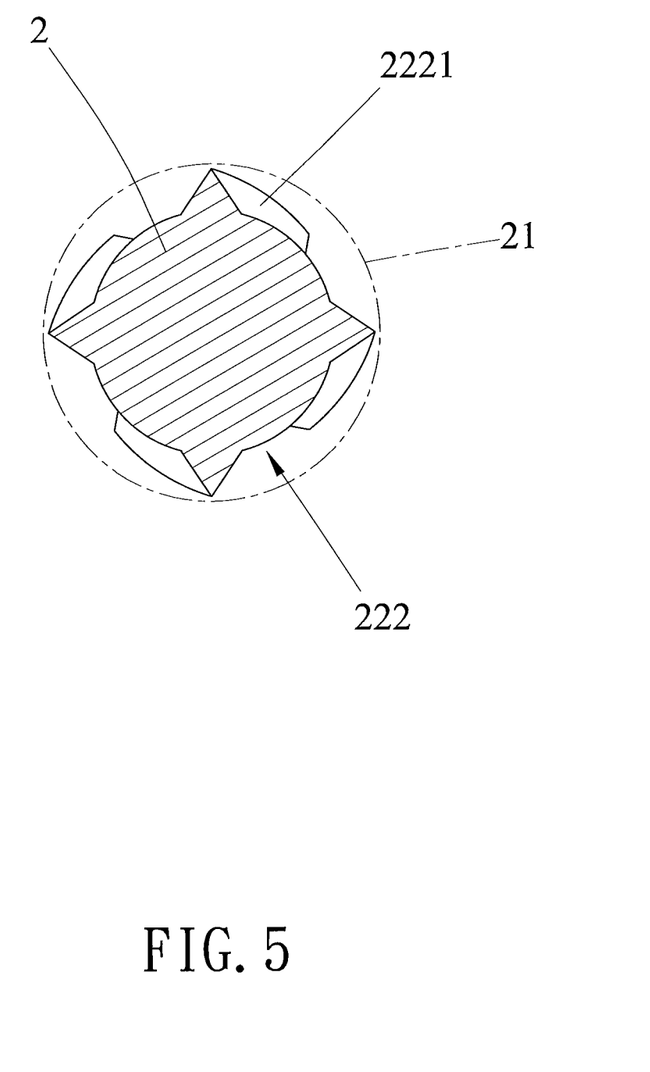
FIG. 5 is a partial sectional view showing a cutting section of the first embodiment for the wood screw.

Referring to FIG. 1 to FIG. 3, a wood screw according to the present invention is disclosed herein. It mainly comprises a screw head (1) and a rod body (2) integrally extended from the screw head (1) in an axial direction. The rod body (2) comprises a shank part (21) of a first root diameter (a) and a screwing part (22) defined by a threaded section (221) of a second root diameter (b) and a cutting section (222) being connected between the shank part (21) and the threaded section (221) and being of a third root diameter (c). The second root diameter (b) of the threaded section (221) is less than the first root diameter (a) of the shank part (21), and the third root diameter (c) of the cutting section (222) is less than the first root diameter (a) of the shank part (21). The threaded section (221) has a tip portion (2210) at a bottom end thereof and a screw thread (2211) helically extended therearound from a juncture between the threaded section (221) and the cutting section (222) toward the tip portion (2210). The cutting section (222) has a cutting unit (2221) disposed thereon to define a maximum outer diameter (d) thereof being less than or equal to the first root diameter (a) of the shank part (21). The screw head (1) and the cutting section (222) are connected by the shank part (21). Furthermore, the first root diameter (a) of the shank part (21) is larger than or equal to the maximum outer diameter (d) of the cutting unit (2221) of the cutting section (222). A length ratio of the cutting section (222) to the threaded section (221) is 1:3 to 1:8.

In actual implementation, the present invention provides various embodiments of the cutting unit (2221) of the cutting section (222) as shown in FIG. 1 to FIG. 7.

Example 1

Referring to FIG. 3, a first embodiment for a wood screw according to the present invention is disclosed. The cutting unit (2221) comprises a plurality of screw threads (2221A) disposed helically around the cutting section (222) by thread rolling.

Example 2

Figure 6:
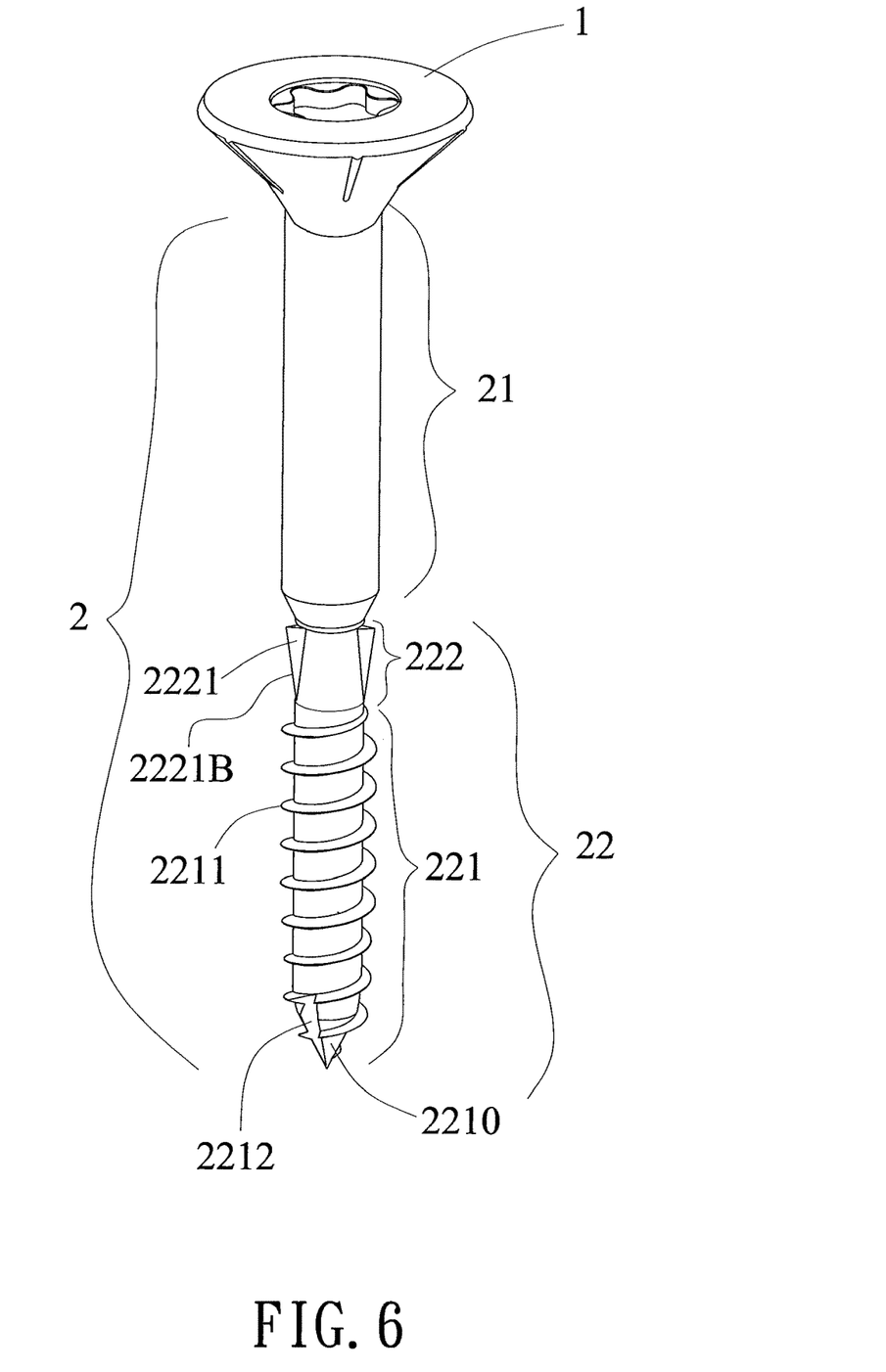
FIG. 6 is a stereogram showing a second embodiment for a wood screw according to the present invention.

Referring to FIG. 6, a second embodiment for a wood screw according to the present invention is disclosed. The cutting unit (2221) comprises a plurality of cutting teeth (2221B) axially disposed on the cutting section (222) by clamping.

Example 3

Figure 7:
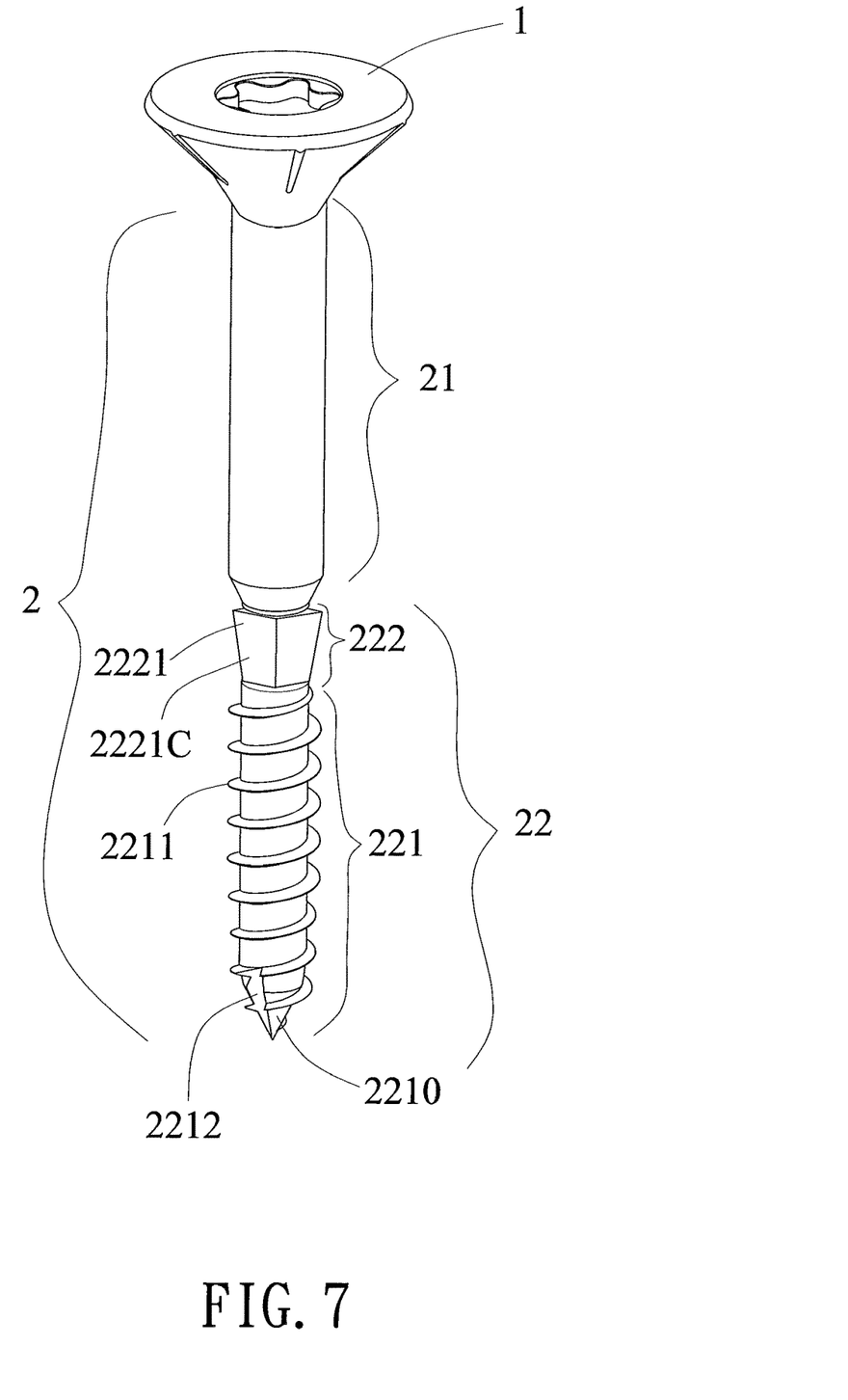
FIG. 7 is a stereogram showing a third embodiment for a wood screw according to the present invention.

Referring to FIG. 7, a second embodiment for a wood screw according to the present invention is disclosed. The cutting unit (2221) comprises a plurality of cutting planes (2221C) integrally disposed on the cutting section (222) by forging.

In a practical use as shown in FIG. 1 to FIG. 7, the tip portion (2210) of the threaded section (221) is further provided with a cutting slot (2212) to disconnect the screw thread (2211) around the tip portion (2210). The tip portion (2210) of the wood screw is pierced into an object (A) for positioning, and then the screw thread (2211) of the threaded section (221) is drilled into the object (A). In the steady positioning state, the cutting slot (2212) accelerates and assists the wood screw to cut and drill the object (A) and discharges wood shavings simultaneously. After the wood screw is gradually drilled into the object (A), the cutting unit (2221) on the cutting section (222) assists the cutting process. The cutting unit (2221) formed on the cutting section (222) has excellent cutting effect whether it is made by thread rolling, clamping or forging. When the wood screw is screwed into the object (A), the cutting unit (2221) previously cuts wood fibers of the object (A), so that a lateral resistance generated by the shank part (21) of a larger diameter screwing into the object (A) can be reduced. The design of the first root diameter (a) of the shank part (21) larger than or equal to the maximum outer diameter (d) of the cutting unit (2221) of the cutting section (222) enables the cutting unit (2221) to drill the object (A) to form a smooth inner cutting hole for correspondingly and tightly contacting the shank part (21). Accordingly, the present invention can reduce a gap between the wood screw and the object (A) by the shank part (21) tightly contacting the inner cutting hole and achieve the effects of withstanding high tensile force and shear stress.

Compared with the conventional technique available now, the present invention has the following advantages:

1. The allocation of the cutting unit of the cutting section ahead of the shank part in the screw-in direction can reduce the lateral resistance of the rod body generated by the shank part of a larger diameter screwing into an object.

2. The design of the maximum outer diameter of the cutting unit of the cutting section not larger than the first root diameter of the shank part enables the cutting unit to drill the object to form a smooth inner cutting hole for correspondingly and tightly contacting the shank part. Accordingly, the present invention can reduce a gap between the wood screw and the object so as to achieve the effects of withstanding high tensile force and shear stress.

What is claimed is:

1. A wood screw, comprising:
   a screw head; and
   a rod body integrally extended from the screw head in an axial direction and including:
      a shank part having a first root diameter, and
      a screwing part defined by:
         a threaded section having a second root diameter less than the first root diameter of the shank part, and
         a cutting section being connected between the shank part and the threaded section and having a third root diameter less than the first root diameter of the shank part,
   wherein the threaded section has a tip portion at a bottom end thereof and a screw thread helically extended therearound from a juncture between the threaded section and the cutting section toward the tip portion, and
   wherein the cutting section further has a cutting unit disposed thereon, the cutting unit having a maximum outer diameter less than or equal to the first root diameter of the shank part.

2. The wood screw as claimed in claim 1, wherein the cutting unit comprises a plurality of screw threads disposed helically around the cutting section.

3. The wood screw as claimed in claim 2, wherein the tip portion of the threaded section is provided with a cutting slot to disconnect the screw thread around the tip portion.

4. The wood screw as claimed in claim 3, wherein a length ratio of the cutting section to the threaded section is 1:3 to 1:8.

5. The wood screw as claimed in claim 1, wherein the cutting unit comprises a plurality of cutting teeth axially disposed on the cutting section.

6. The wood screw as claimed in claim 5, wherein the tip portion of the threaded section is provided with a cutting slot to disconnect the screw thread around the tip portion.

7. The wood screw as claimed in claim 6, wherein a length ratio of the cutting section to the threaded section is 1:3 to 1:8.

8. The wood screw as claimed in claim 1, wherein the cutting unit comprises a plurality of cutting planes integrally disposed on the cutting section.

9. The wood screw as claimed in claim 8, wherein the tip portion of the threaded section is provided with a cutting slot to disconnect the screw thread around the tip portion.

10. The wood screw as claimed in claim 9, wherein a length ratio of the cutting section to the threaded section is 1:3 to 1:8.

11. The wood screw as claimed in claim 1, wherein the tip portion of the threaded section is provided with a cutting slot to disconnect the screw thread around the tip portion.

12. The wood screw as claimed in claim 11, wherein a length ratio of the cutting section to the threaded section is 1:3 to 1:8.

\* \* \* \* \*